Nov. 21, 1972   J. E. JORDAN   3,703,364
PRODUCTION OF OIL-PRILLED FERTILIZER MATERIALS
Original Filed Aug. 28, 1970   3 Sheets-Sheet 1

METHODS OF INCORPORATING ADDITIVES IN
OIL PRILLING PROCESS FOR PRODUCTION
OF UREA-AMMONIUM PHOSPHATES

*John E. Jordan*, INVENTOR.
BY *Robert W. Petrash*

EFFECT OF LAURIC ACID ADDITION ON OIL CONTENT OF 36-18-0 PRODUCT PRILLED IN MINERAL SEAL OIL

UREA-AMMONIUM PHOSPHATES (50% OF $P_2O_5$ AS POLYPHOSPHATES):
EFFECT OF OIL VISCOSITY AND FATTY ACID ADDITION ON
OIL CONTENT OF 36-18-0 GRADE PRODUCTS

United States Patent Office 3,703,364
Patented Nov. 21, 1972

3,703,364
PRODUCTION OF OIL-PRILLED FERTILIZER MATERIALS
John E. Jordan, Sheffield, Ala., assignor to Tennessee Valley Authority
Continuation of application Ser. No. 67,878, Aug. 28, 1970. This application Apr. 8, 1971, Ser. No. 132,371
Int. Cl. C05b 19/02
U.S. Cl. 71—29   5 Claims

ABSTRACT OF THE DISCLOSURE

Process for oil prilling urea and/or urea-ammonium phosphates. Improvements include increased oil removal from the products by (1) including small amounts of additives in the oil prilling bath, (2) selecting a prilling bath oil having a low viscosity and, (3) washing the oil-prilled products during the oil removal process. Methods result in products of enhanced value because of the lowered oil content. Additives include certain fatty acids. Washing media include methyl alcohol and phosphoric acid. Prilling bath oil is selected from naphthenic and/or isoparaffinic based hydrocarbons, for prevention of urea adduct formation in the production of liquid fertilizer.

---

Figure 1:
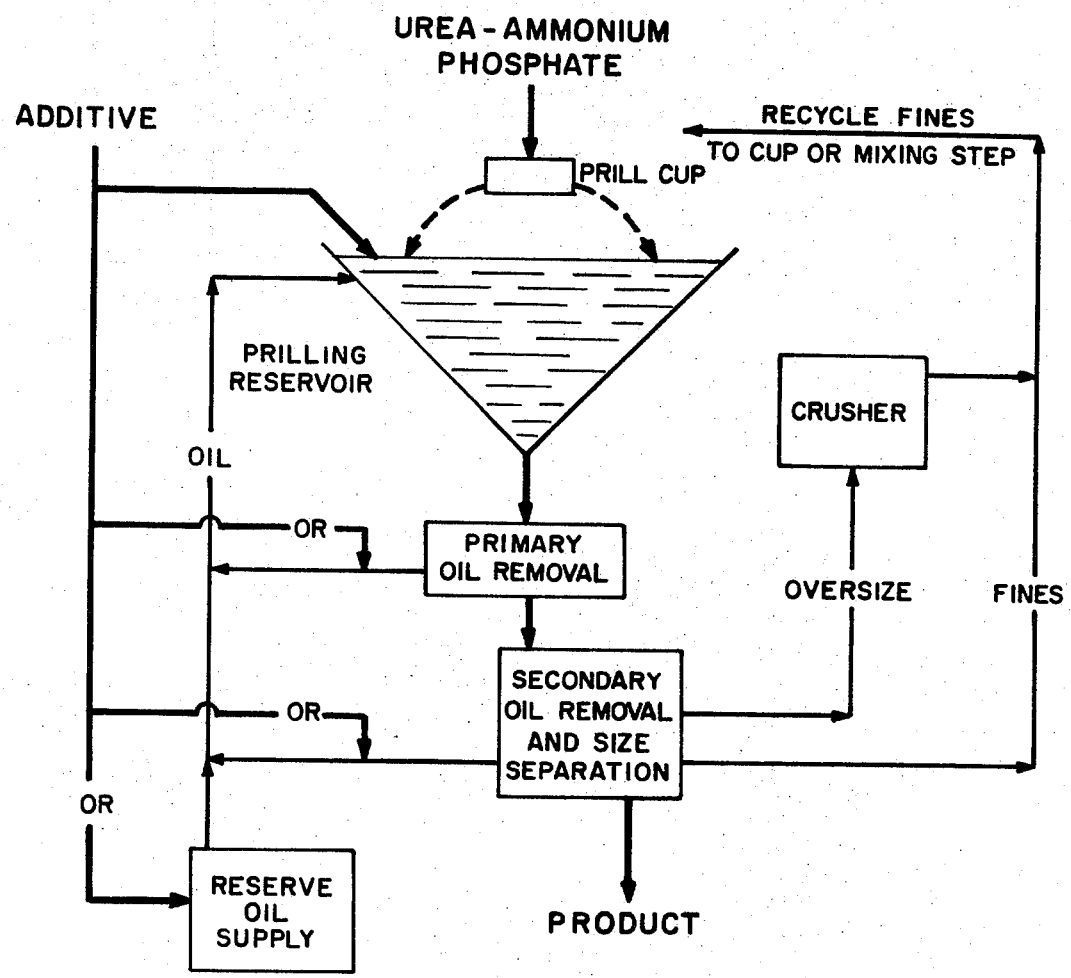

The invention herein described may be manufactured and used by or for the Government for governmental purposes without the payment to me of any royalty therefor.

This application is a continuation of application Ser. No. 67,878, filed Aug. 28, 1970, for Production of Oil-Prilled Fertilizer Materials.

My invention relates to certain improvements in the prilling of urea and urea-ammonium phosphate melts in liquid media; more particularly it relates to oil prilling of urea and urea-ammonium phosphate melts wherein the ultimate product is less contaminated by the prilling oil than has heretofore been possible; and still more particularly it relates to the inclusion of small amounts of additives to the oil-prilling bath wherein urea or urea-ammonium phosphate prills passing therethrough have oil contents lower than heretofore obtainable without the use of such additives. Further, my invention relates to the reduction of the oil contents of products prilled in oil based media by washing the prilled material with liquids. Still further my invention relates to the production of oil-prilled solid products that are suitable for usage in the production of liquid fertilizers by proper selection of the composition of the oil used in the prilling medium.

Heretofore oil left in and on oil-prilled fertilizer materials has been objectionable for several reasons: (1) dilution of the fertilizer, (2) cost of the oil lost, (3) an unsightly layer of oil on liquid fertilizers resulting from the addition of the oil-prilled materials to water, and (4) unacceptability of the products from the viewpoint of handling and appearance. It is therefore desirable to reduce prill oil content to as low a value as practical and thereby diminish or eliminate these objectionable qualities.

The art of granulating fertilizers by prilling into oil is not new in the sense that the production of calcium nitrate by this method has been practiced in some European countries for several decades. However, the art of oil-prilling ammonium phosphate is in its infancy, as is evidenced by U.S. application Ser. No. 750,277, Aug. 5, 1968, Bottai et al., and by U.S. application Ser. No. 754,465, Aug. 21, 1968, Mann, both of which are assigned to the assignee of the present invention. Some of the prior art is directed to the addition of materials to the oil prilling bath for such purposes as reducing the "greasy feel" of the product or for purposes of providing a moisture barrier thereon or imparting thereto improved anti-caking properties. For instance, in Hallie et al. U.S. 2,793,398) there is described the prilling of urea in oil containing a modifier such as paraffin or stearic acid wherein the additive (15–25% by weight of the oil) is incorporated to minimize on the "greasy feel" of the product but not to reduce the oil content thereof. In British Pat. No. 794,855, May 14, 1968, there is described a process for adding seed crystals to an oil prilling bath containing 10 percent paraffin to induce more rapid crystallization of aqueous melts of ammonium nitrate, calcium nitrate, or urea. The stated purpose of the paraffin addition is to coat the prills so that they are less sensitive to moisture and would cake less in storage. Again, there is no teaching for actually reducing the oil content of the prilled products. In addition, in both of these teachings, the amount of additives in the oil bath is 10 percent or more of the weight of the bath. Neither of these two prior-art references teach that the oil used in the prilling operation has an effect on the quality of the prill produced or on the prill oil content. In fact, Hallie and Hoogendonk (U.S. 2,793,398) teach that very prolonged and intense centrifuging must be used to reduce urea prill oil content to a low level, apparently not recognizing the beneficial effects from proper selection of the prilling medium.

Also available in the prior-art literature are numerous references which relate to the formation of adducts (addition compounds) between urea and organic materials. These adducts are reported to have been formed in oils with straight-chain, branched-chain, and cyclic configurations. One stated purpose of the formation of these adducts has been to remove unwanted fractions of organic fluids and another to form highly purified fractions thereof. My work has shown that some of the oils used as prilling media and some of the additives incorporated to lower the oil content of the product also form adducts with urea but only when catalyzed with methyl alcohol or water. These adducts can be dissolved in an excess of water. My test data indicate, however, that the effectiveness of the additives is not dependent on the ability of either the oil or the additive to form such adducts as petrographic x-ray and infrared analyses have failed to find any of the adducts in our oil-prilled products. Such adducts apparently are formed only in alcohol or water solutions of such products.

I have developed an improved process for the oil prilling of both urea and the relatively new urea-ammonium phosphate materials, as in Bottai et al., supra, wherein I am able to reduce the oil content of the ultimate product through the addition of minor amounts of certain additives to the oil-prilling bath or by the proper selection of the composition of the oil used as the prilling medium. Furthermore, I have found that selection of the composition of the oil used as a prilling medium has a decided effect on the quality of the liquid fertilizers which I can make from the solid prilled products of my invention.

In my improved process of oil prilling, the operating procedures and equipment used in most of my tests are similar to or the same as those described in the Pottai et al. application, supra, for the oil prilling of urea-ammonium phosphate with the exception that in my process there is the additional provision made for the addition of the additives to my system. Other than a slight reduction in prill size and significant reduction in oil content, after centrifuging, I have found little difference in prills formed in an oil medium and those formed in an oil-additive medium. This minor difference in prill size can be overcome by proper selection of prilling conditions (size of holes in prill cup and rotational speed of prill cup). In either medium the prill quality is the same. It was also found that changing the composition of the oil used has no effect on prill size. Utilization of a mixing step for urea and ammonium phosphates results in a more porous prill which is advantageous in that oil soaks into the prill interior more rapidly on storage, thereby effectively removing oil from the surface of the prill and a product is obtained that oftentimes has better storage properties. My studies have been made with ammonium phosphates prepared with electric-furnace phosphoric acids, as well as with wet-process phosphoric acids and with urea solutions of about 99.5 percent concentration. I have found that when I add small amounts of either saturated or unsaturated fatty acids, i.e., from about 0.01 to about 5 percent by weight of the oil used for prilling and preferably from about 0.25 to about 1 percent, the oil content of the prills after centrifuging is reduced significantly to about 0.5 percent or lower of the total weight of the prills; whereas, without the use of these additives, the oil content thereof is generally between about 1 and 2 percent of the total weight of the prills. I have also found that if I use too much additive, i.e., more than about 5 percent, for some unknown reason the oil content of the prills so produced is oftentimes as great and greater than if no additive were used at all. The saturated fatty acids that I have tested and found to give the desired results include lauric, myristic, octanoic, palmitic, and stearic acids. The unsaturated oleic acid gives the desired results as well as cottonseed oil that is principally a mixture of the unsaturated oleic and linoleic acids and saturated palmitic acid. In my earliest tests, the additive had been incorporated into the oil prior to the prilling. In later tests, which were done under continuous operation, I found the additive could be added to the prilling vessel as well as to the oil prior to introduction to the prilling vessel. It may also be feasible to put the additive into one or both of the raw materials when prilling urea-ammonium phosphate or into the urea solution or melt when producing straight urea prills.

In addition to the benefits uncovered through the use of the additives, as discussed above, I have also determined the values of other variables in the process on effecting the products therefrom. For instance, I have also found that when oils of lower viscosity or surface tension are utilized in the prilling medium that the prill oil content after centrifuging is decreased. Furthermore, I have found that in urea-ammonium phosphate production when intimate mixing of the urea and ammonium phosphate melt is employed prior to prilling that a more porous product is produced and significantly less time is required for the oil to soak into the prills to give a dry appearing product. Also, I have found that proper selection of the composition of the hydrocarbons in the prilling oil is important if the products are to be utilized in the manufacture of liquid fertilizers. With improper selection insoluble urea-oil adducts are formed.

It is therefore an object of the present invention to produce prills of urea-ammonium phosphate and/or urea which have excellent handling and storage properties.

Another object of the present invention is to produce prilled urea-ammonium phosphate or straight urea products by oil prilling wherein the oil content of the prilled products is reduced by adding to the prilling liquid medium minor proportions of an additive selected from the group of fatty acids consisting of lauric, myristic, octanoic, oleic, palmitic, stearic, and mixtures thereof.

A further object of the present invention is to produce prilled urea-ammonium phosphate or straight urea products by oil prilling wherein the oil content of the prilled products is reduced by washing the prills with a liquid. Washing liquids that are miscible or immiscible with oil may be utilized.

A still further object of the present invention is to produce prilled urea-ammonium phosphate or straight urea products by oil prilling wherein the prilled solid products are suitable for use in the production of clear liquid fertilizers.

My invention, together with further objects and advantages thereof, will be better understood from a consideration of the following description taken in connection with the accompanying drawing in which:

FIG. 1 is a flowsheet generally illustrating the principles of my improved, new, and novel process which results in unique urea-ammonium phosphate prills having the novel properties mentioned above, it being understood that the FIG. 1 principally describes that embodiment of my improvement wherein I prill urea-ammonium phosphates in oil to which my new found additive is added, but that the figure may be modified as shown thereon so as to carry out my improved process by the prilling of straight solutions or melts of urea. The figure may be modified also by adding a step for washing centrifuged prills with liquids that are either miscible or immiscible with the oil. It is to be understood that my specific description of FIG. 1 will emphasize for convenience to the reader that embodiment of my improvement by describing its application to production of urea-ammonium phosphates by prilling in liquid medium, but that, however, by the modification shown thereon, the description thereof may be easily modified to cover the production of straight urea prills.

Referring now more specifically to FIG. 1, it may be seen that the operating procedures (except when running straight urea prills) and equipment used are substantially the same as those described in the Bottai application, supra, with the exception that provision is made in my process for the addition of the additives to the system.

As in Bottai supra or Mann supra, the phosphoric acid used may be of either the electric-furnace type or wet-process type, or mixtures thereof, and a wide variety of acid concentrations may be used to produce materials containing up to about 98 percent of the $P_2O_5$ as polyphosphates. Acids of the merchant-grade strength (50–58 percent $P_2O_5$ with a wet-process orthophosphoric acid and 50–69 percent $P_2O_5$ with electric-furnace orthophosphoric acid) may be ammoniated by the process shown in U.S. 3,382,059, Getsinger, and in patent application Ser. No. 658,962, filed Aug. 7, 1967, Siegel et al., assigned to the assignee of the present invention. Also acids in the superphosphoric acid range (68–79 percent $P_2O_5$ with wet process and 72–85 percent $P_2O_5$ with electric-furnace acid) may be ammoniated in a closed vessel at atmospheric or elevated pressures according to the teachings of U.S. 3,336,127, Hignett et al., and the parent patents thereof. Either freshly prepared ammonium phosphate melt or ammonium phosphate solid may be utilized.

Electric-furnace superphosphoric acid of 85 percent $P_2O_5$, which is about the maximum concentration of superphosphoric acid taught by Huhti and Gartaganis (see Canadian Journal of Chemistry, vol. 34, 1956, page 790) contains about 98 percent of the $P_2O_5$ as polyphosphates. Wet-process superphosphoric acid of about 79 percent $P_2O_5$ would contain a similar proportion of $P_2O_5$ as polyphosphates. Urea solutions of 97 percent or greater concentration are preferred, as in Bottai supra. It should also be pointed out that solid urea may be used in my process if one desires to pay the considerable higher premium cost thereof and if the ammonium phosphate is applied as a hot melt. However, the great advantages of Bottai's process supra and my improvement thereover are more fully realized when urea solutions of at least about 97 percent concentration are employed. Alternatively, it is possible to utilize solid ammonium phosphate with urea solution.

Figure 2:
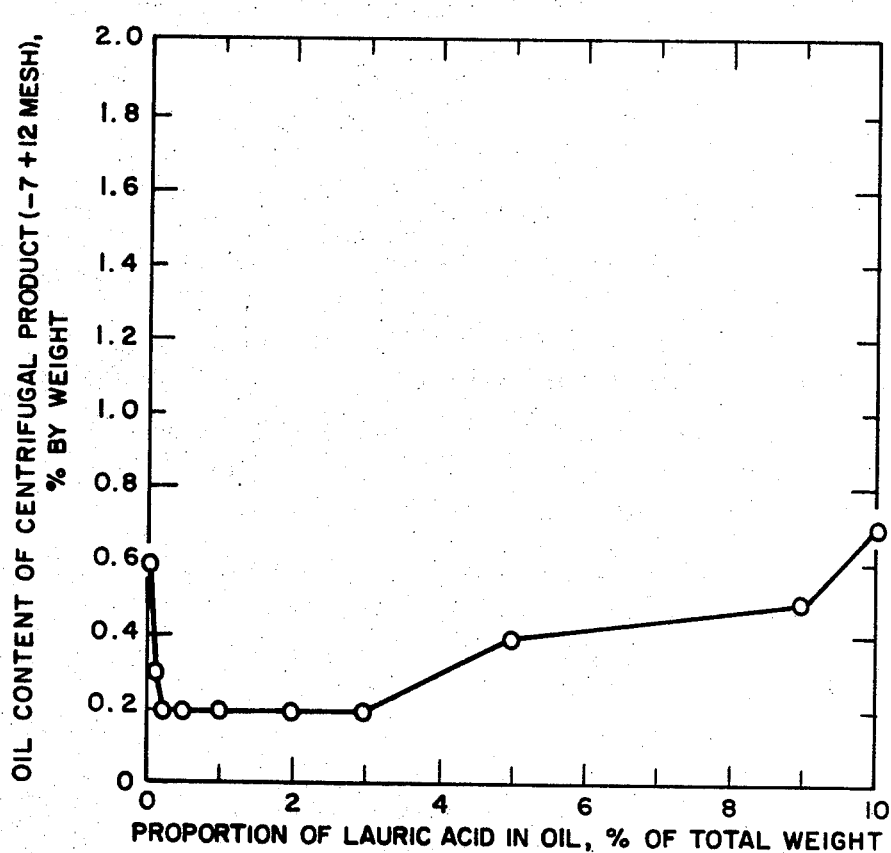

In my processes, the amount of additive that is included in the oil has ranged from 0.1 to upwards of 10 percent by weight of the oil. Although the amount of additive required for optimum effect possibly varies with the type and purity of the additive and the composition of the oil used, the inclusion of .25 to about 5 percent by weight of the additives in the oils appears to be acceptably close to the optimum. As illustrated in the tabulation below, and in FIG. 2, it is important to have the proper proportion of additive. Too much additive as well as no additive gives poor results. From my tests up to about 10 percent of additive is as much as should be added to obtain beneficial reduction in prill oil contents.

| Oil used | Stearic acid added to oil, percent by wt. of oil | Oil content of 36-18-0 grade prills after centrifuging at 600 G. for 5 minutes, percent |
|---|---|---|
| Metal quenching | 0 | 1.1 |
| Do | 1 | 0.4 |
| Do | 10 | 1.7 |

I have not been able to define the role of the additives in reducing prill oil content or to determine the amount of additive in the prilled product. Chemical analyses of fresh and used oils showed that their additive content did not change. Therefore, it is likely that the additive content of the product is quite low and in the same proportion of additive to oil as in the prilling medium. Prills formed in a medium containing 0.25 percent of an additive would contain 0.00125 percent by weight of additive if they contained 0.5 percent by weight of oil. With additive that costs $0.30 to $0.40 per pound the amount present would cost less than $0.01 per ton of product.

Incorporation of the additives has no deleterious effect on the storage properties of products, as is illustrated below in Table I.

In my processes the liquids that have been utilized as washing mediums include methanol and phosphoric acids. Good results were obtained with all mediums. The solubilities of urea-ammonium phosphates and urea in the mediums were very low. Although the amount of washing medium required for optimum effect possibly varies with the medium used, the composition of the oil and the amount of oil on the prills, the utilization of from 0.1 to 1 pound of washing liquid per pound of washed product appears to be reasonably close to the optimum. It, of course, would be possible to utilize greater proportions of washing medium without adverse effect but improved results would not be obtained and the use of unnecessarily large proportions of washing mediums would not be economical.

Urea-ammonium polyphosphate is a very useful material for the preparation of high-analysis liquid fertilizer. Potash-containing fertilizer solutions made from this product generally are of higher grades than can be made with the phosphates currently available to industry and the commonly used urea-ammonium nitrate solution. My studies made with oils composed predominantly of the four principal types of hydrocarbons (normal paraffinic, isoparaffinic, naphthenic, and aromatic), as well as oils which were mixtures of all four types of hydrocarbons, showed that the type of oil used in the preparation of the solid prills has a significant effect on the quality of the liquid fertilizer obtained on dissolution of the prills in water. Use of prills made in oils composed predominantly of naphthenic hydrocarbons or isoparaffinic hydrocarbons resulted in satisfactory liquids. Emulsions composed predominantly of urea-oil adducts generally formed when nonpotash liquids were prepared from prills made in oils composed predominantly of aromatic hydrocarbons, normal paraffinic hydrocarbons or mixed-base oils containing large proportions of normal paraffinic hydrocarbons. However, these emulsions had less tendency to form when the prills were used to produce potash grades, which required larger proportions of water.

My studies with the oils of various base hydrocarbons also showed that prill oil content was directly influenced by the viscosity of the oil used for the prilling; prill oil content decreased as the oil viscosity was decreased. Otherwise, prill quality was unaffected by use of the various oils as prilling mediums.

In order that those skilled in the art may better understand how the present invention can be practiced, the following examples of processes I have used in the production of prilled urea and prilled urea-ammonium phosphate materials employing a liquid quenching medium (normally consisting primarily of oil) therefore are given by way of illustration and not by way of limitation.

TABLE I.—STORAGE PROPERTIES OF OIL-PRILLED PRODUCTS WITH AND WITHOUT ADDITIVE IN OIL

| Test Number | Oil used | Additive to oil, percent by wt. | Product condition after storage for indicated time | |
|---|---|---|---|---|
| | | | 1 month | 3 months |
| 83a | Metal quenching | None | No lumps | No lumps. |
| 83c | do | 1% stearic acid | | Do. |
| 85b | do | do | No lumps | |
| 95a | do | None | do | |
| 109 | Deodorized kerosene | 0.25% lauric acid | do | |

EXAMPLE I

Effect of additives

In this series of tests, exploratory laboratory tests were conducted for the incorporation of small amounts of various additives in the oil prilling bath to study their effects on the oil contents and physical properties of the prilled products. Additives studied in this series of work included several fatty acids. Evaluation was made on the amount of oil retained by the prills after centrifuging. All products were very hard when made. The results of these tests are tabulated for the sake of convenience in Table II.

TABLE II.—OIL-PRILLED UREA AMMONIUM PHOSPHATE AND UREA, EFFECT OF ADDITIVES

| Prilling medium | | | Oil content of −7+12 mesh product centrifuged for 1 min. at 1,400 G, percent | Screen analysis (mesh) percent | | |
|---|---|---|---|---|---|---|
| Oil | Additive | | | +7 | −7+12 | −12 |
| | Identity | Concentration in medium, percent by wt. | | | | |
| Tests with 36–18–0 grade products (50% of $P_2O_5$ as polyphosphates) | | | | | | |
| Metal quenching | None | | 0.8 | 38 | 47 | 15 |
| | Palmitic acid | 0.25 | 0.3 | 32 | 54 | 14 |
| | Myristic acid | 0.25 | 0.2 | 25 | 57 | 18 |
| | Cottonseed oil | 0.25 | 0.6 | 37 | 49 | 14 |
| Kerosene | None | | 0.4 | 34 | 49 | 17 |
| | Myristic acid | 0.25 | <0.1 | 24 | 53 | 23 |
| No. 2 fuel oil | None | | 0.2 | 23 | 55 | 22 |
| | Myristic acid | 0.25 | 0.1 | 10 | 62 | 28 |
| Rabtex oil | None | | 0.9 | 37 | 46 | 17 |
| | Lauric acid | 0.25 | 0.4 | 18 | 60 | 22 |
| | do | 0.5 | 0.6 | 12 | 61 | 27 |
| | Octanoic acid | 0.25 | 0.4 | 12 | 64 | 24 |
| | Palmitic acid | 0.25 | 0.6 | 28 | 53 | 19 |
| Tests with urea | | | | | | |
| Metal quenching | None | | 0.5 | 16 | 61 | 23 |
| | Lauric acid | 0.25 | 0.4 | 10 | 60 | 30 |

EXAMPLE II

Use of additives to oil

In this series of tests, plant ammonium polyphosphate of 1.50–62.1–0 grade (60.4% and $P_2O_5$ as polyphosphate) and commercial, unconditioned urea prills were crushed to minus 16 mesh and blended to give a 36–18–0 grade mixture. This mixture was fed continuously, at the rate of 20 pounds per hour by means of a disk feeder, into a 3-inch-diameter by 3-inch-deep stainless steel melter equipped with a propeller-type agitator. Sufficient water was added to the melter to simulate use of 99.5 percent urea solution and give products containing about 0.3 percent $H_2O$. The temperature in the melter was maintained at about 280° F. by means of a gas flame. Molten product flowed by gravity from the melter into a 3-inch-diameter prilling cup, which had three 3¼-millimeter holes and which was rotated at a speed of 350 r.p.m. The prills dropped about 1 foot through air before falling into the prilling media in 5-gallon containers; the depth of oil was maintained at 7 inches. The containers were set in a 3-foot-diameter tub partially filled with water. When the use of fatty acid additives were tested, they were mixed with the oil prior to the test. The fatty acid additives were solids and appeared to be completely soluble in the oils.

Oil was removed from the prills by centrifuging in a laboratory-scale basket-type batch centrifuge. The rotational speed of the centrifuge was adjusted to give a centrifugal force of 1400 G at the rim of the basket; a 16-ounce bottle of prills, flooded with oil was dumped rapidly into the basket, the basket was rotated for 1 minute, and then stopped as rapidly as possible. Centrifuging at lower G forces was not attempted. Two of the products made with oils of low viscosity also were filtered to test this means of de-oiling.

Five different oils (metal quenching oil, two mineral seal oils, gas absorber oil, and kerosene) were used in the tests. The viscosities of these oils varied from about 1.5 to 119 centistokes at 100° F. The surface tension (24–30 dynes/cm. at 100° F. by capillary tube method) and density (0.76–0.90 at 100° F.) also decreased as the viscosity decreased. Incorporation of additives had little or no effect on the viscosity, density, or surface tension.

The following general conclusions can be drawn from the tests. Typical data is plotted on FIG. 2.

(1) Prill oil contents decreased with inclusion of small amounts of fatty acids to all oils and resulted in lowering the oil content of the centrifuged products to about 30 to 40 percent of the value obtained when the fatty acids were omitted. Maximum benefit was obtained by inclusion of about ¼ to 2 percent of the additives; however, the inclusion of up to about 5 percent of the additives resulted in beneficial reduction in prill oil content; and (2) In some cases, the addition of fatty acids to the oils resulted in a slightly reduced particle size in the prills produced, larger amounts of the acids having the greater effect. However, no attempt was made in these tests to identify the best conditions to produce the maximum proportion of prills in the minus 7- plus 12-mesh onsize range. The particle shape did not suffer.

EXAMPLE III

Small-scale tests of the effectiveness of various liquids as washing mediums to de-oil urea-ammonium phosphate prills were carried out by placing about 2 pounds of freshly produced minus 7- plus 12-mesh material in a rotating batch-type centrifuge and distributing the liquids onto the prills in a maximum time of 5 seconds through either an open-end pipe or a spray nozzle. The centrifuge was rotated at 1500 r.p.m. which is equivalent to a centrifugal force of 350 G at the basket wall. This amount of prills formed a bed about 1 inch thick. The prills then were centrifuged for an additional 30 seconds. Products of 30–30–0 and 39–13–0 grades were processed. The products were made with mineral seal oil G, hydraulic oil 3146 H, and roll oil 3190 H; all oils contained added lauric acid (½ percent). The liquids used for washing were methyl alcohol and electric-furnace phosphoric acids of 60, 70, and 72 percent $P_2O_5$ contents. Generally 0.1 pound was added per pound of prills.

Recentrifuging the prills for 30 seconds at 350 G without washing removed 50 to 60 percent of the oil but did not result in prills that were dry appearing. Washing of the prills removed additional oil and resulted in prills which were dry appearing, hard, and not sticky. Generally, a total of about 80 to 90 percent of the oil was removed. The methanol and phosphoric acids were equally effective in removing oil and generally separated from the oil on standing.

EXAMPLE IV

Laboratory tests were made of the dissolution of oil-prilled urea-ammonium phosphates under simulated field conditions to determine the maximum grades that can be prepared with reasonable mixing time and the effects of the residual prilling oil on quality of the solutions. The solutions were made in kilogram batches and special precaution was taken to ensure against heat transfer during dissolution. The procedure for preparing the liquids consisted of mixing the prills with 80° F. water with fairly vigorous mixing in a Dewar flask until essentially all had dissolved. A mixing time of 30 minutes was considered to be about the maximum practical. After mixing, the appearance of the liquid was evaluated and the presence of any undissolved material noted. A second evaluation was made after the solution stood undisturbed overnight. Typical data from the tests made to date are shown below in Table III.

All the solutions made from the oil-prilled products contained a layer of either clear oil or an emulsion. In some cases, undissolved solids were present also either in the emulsion layer or in the liquid. The emulsions were water:prill ratio; exclusive of the potassium chloride, the grade would be only 10.5–10.5–0.

In preparation of 18–9–0 grade solution from 36–18–0 grade prills, the naphthenic-base prilling oils caused less interference with liquid quality. With five out of six naphthenic-base oils, satisfactory 18–9–0 grade solution was made in 15 to 30 minutes. With most of the other oils tested, the quality of the 18–9–0 was rated questionable.

The incorporation of fatty acid additives to the oil for the purpose of reducing prill oil content had no effect on liquid quality. The results indicated also that, in regard to quality of solutions, the quantity of residual oil on the prills is probably of less significance than the type of oil.

TABLE III.—LABORATORY PREPARATION OF FERTILIZER SOLUTIONS FROM OIL-PRILLED UREA-AMMONIUM PHOSPHATES

[50% of $P_2O_5$ as polyphosphate]

| | | Quality of liquid after mixing for minutes indicated in parentheses | | | |
|---|---|---|---|---|---|
| | Oil content of prills, percent | Made from 30–30–0 grade prills | | | Made from 36–18–0 grade prills, 18–9–0 |
| Oil used in prilling | | 17–17–0 | 16–16–0 | 9–9–9 | |
| Normal paraffinic-base oils: | | | | | |
| Kerosene | 0.6–0.7 | 2H (30) | 2L (30) | 1L +10) | 2L (30)² |
| Deodorized kerosene–9 | 0.1 | 2H (30) | 2L (30) | 1L (10) | |
| No. 2 fuel oil | 0.5 | | | | 2U (30)² |
| Isoparaffinic-base oil: Roll oil 3190 | 1.0–1.3 | | 1L (25) | 1L (10) | 2U (30)² |
| | 0.1⁴ | | | | 1L (30) |
| Mixed-base oils: | | | | | |
| Metal quenching oil 522 | 1.7 | | 2L (30) | 2L (10)³ | |
| | 2.2 | | | | 2L (30) |
| | 0.6 | 2H (30)² | 2H (30)² | | |
| Mineral seal oil | 0.9 | | 2L (30) | | 2H '30) |
| | 1.5 | | 2L (30) | 2L (10) | |
| Cutting oil 1564 | 0.7–0.8 | | 2L (20) | | 1L (17) |
| | 1.9 | | | 1L (10) | |
| Aromatic-base oil: Aromatic quench oil | 0.2 | | | | 2U (30)³ |
| Naphthenic-base oils: | | | | | |
| Lubricating oil 2110 | 0.7 | | | 1L (12) | |
| | 1.0 | 2L (30) | 1L (30) | | |
| Lubricating oil R | 0.4–0.5 | 1L (15)² | 1L (15)² | 1L (10)² | 1L (15)² ⁵ |
| | 0.9–1.0 | 2U (30)² | 1L (15) | 1L (10) | 1L (15) |
| | 1.5 | 1L (15)² | | | |
| Lubricating oil 50 | 1.0 | | | | 1L (30) |
| Hydraulic oil 3146 | 0.3 | | | | 1L (15) |

¹ Potash furnished as potassium chloride.
² Oil contained 0.25% lauric acid.
³ Became 1L with overnight standing.
⁴ Oil contained 0.5% lauric acid.
⁵ Similar results in tests in which the oil contained 0.5% by weight of lauric acid, or 0.25% of octanoic acid, or 0.25% of palmitic acid.

found to consist largely of urea-oil adducts. The quality of the solutions has been rated arbitrarily on the following basis:

Satisfactory (1L): Thin layer of oil only on clear liquid.
Questionable—
  (2L): Thin layer (< about 5% by volume) of emulsion (containing undissolved fines) on top of clear liquid. A minor amount of undissolved prills sometimes present.
  (2U): Small amount of undissolved prills; no significant amount of emulsion.
Unsatisfactory (2H): Thick layer of emulsion (containing undissolved fines) on top of clear liquid. Also undissolved prills were sometimes present.

Solutions of 17–17–0 grade produced from prills made in naphthenic base oils were superior to those made in normal paraffinic- or mixed-base oils containing large proportions of normal paraffinic hydrocarbons. With prills made in the latter two types of oils, lowering the grade to 16–16–0 improved the quality of the solutions but not to an entirely satisfactory rating. Prills made in an isoparaffinic oil also gave a very satisfactory 16–16–0 solution.

Solutions of 9–9–9 grade (made with 30–30–0 grade prills) were satisfactory in all tests except when the prilling medium was mixed base oils containing large proportions of normal paraffinic hydrocarbons. Only 10 minutes of mixing time was required. The relative ease in making this grade product was probably a result of the higher

EXAMPLE V

In small-scale studies, the use of 17 oils as prilling mediums was evaluated during production of 36–18–0 grade product. Oils composed principally of normal paraffinic, isoparaffinic, naphthenic, or aromatic hydrocarbons were tested, as well as oils which were mixtures of all four types of hydrocarbons. The oils were of viscosities ranging from about 1.5 centistokes (kerosene) to 119 centistokes (lubricating oil) at 110° F. Surface tensions ranged from 24 to 30 dynes per centimeter at 100° F., approximately in proportion to the viscosities. Use of additives in some of the oils also was tested.

In the tests, minus 16-mesh blends of plant ammonium polyphosphate of 15–62–0 grade (60% of $P_2O_5$ as polyphosphate) and commercial, unconditioned urea prills were fed continuously, at a rate of 20 pounds per hour, into a small gas-heated melter along with the water to simulate use of commercial 99.5 percent urea solution. Molten material (275°–280° F.) flowed by gravity from the melter into a 3-inch-diameter prilling cup, which had three holes of 3¼-millimeter diameter and which was rotated at a speed of 350 r.p.m. Droplets of the melts were thrown from the cup and fell about 1 foot into oil held in 5-gallon containers; the depth of oil was maintained at 7 inches. When additives were tested, they were mixed with the oil prior to the test. The prills were removed from the oil and then de-oiled by centrifuging in a laboratory-scale basket-type batch centrifuge. Centrifuging conditions were 1400 G for 1 minute. This retention time is longer than could be realized in commercial continuous centrifuges, but the centrifuging conditions were Product bulk densities did not vary with the oil used and ranged from 44 to 47 pounds per cubic foot.

TABLE IV.—PRODUCTION [1] OF 36-18-0 GRADE UREA-AMMONIUM PHOSPHATE

[50% of $P_2O_5$ as polyphosphate]

| Prilling medium | Oil content of −7+12 mesh prills after centrifuging in the vertical-screening centrifuge at indicated centrifugal force, percent by wt. | | | | | | | Oil content of −7+12 mesh prills after centrifuging in batch centrifuge at indicated conditions, percent by wt. | | |
|---|---|---|---|---|---|---|---|---|---|---|
| | | | | | | | | 1 min. at— | | |
| | 800 G | 900 G | 1,000 G | 1,100 G | 1,200 G | 1,300 G | 1,400 G | 350 G | 1,000 G | 1,400 G |
| Half turn helix:[2] | | | | | | | | | | |
| Metal quenching oil | | | 1.8 | | | | 2.1 | 0.9 | | |
| | 1.3 | 1.2 | [3]1.0/1.0 | [3]1.3/1.1 | [3]—/1.2 | [3]—/1.7 | [3]—/1.7 | | | |
| | | 1.4 | 1.2 | 1.6 | | | 1.7 | | | |
| Mineral seal oil | | | 1.0 | | | | | 0.7 | 0.4 | 0.3 |
| | | | 1.4 | | | | | | | |
| | | | 0.9 | | | | 1.1 | | 0.4 | 0.3 |
| Mineral seal oil plus ¼% lauric acid | | | 0.8 | | | | | 1.0 | 0.3 | 0.1 |
| | 0.7 | | 0.7 | | 0.8 | | | 0.9 | 0.2 | 0.1 |
| Kerosene | 0.6 | | 0.6 | | 0.6 | | | 0.7 | 0.2 | 0.1 |
| Full turn helix:[2] | | | | | | | | | | |
| Metal quenching oil | | | 2.0 | | | | 2.0 | 1.1 | 0.6 | 0.5 |
| | 1.1 | 1.2 | 1.6 | 1.3 | 1.4 | 1.3 | 1.3 | | | 0.4 |
| Mineral seal oil | 1.3 | | 1.3 | 1.8 | 1.6 | 1.7 | 1.5 | | | |
| | | 1.4 | 1.4 | | | | 1.4 | 0.6 | | 0.2 |

[1] Prilling temperature was about 275° F.; production rate was about 120 pounds per hour. Recycle fines composed of plant ammonium polyphosphate and urea prills crushed to −12 mesh.
[2] Half-turn helix had a track length approximately 8 inches long; full-turn model had a track length about 16 inches long.
[3] No fines fed to cup.

those possible in commercial batch-interruptable centrifuges. Centrifuged products then were screened to minus 7-plus 12-mesh size. Fines were not recycled to the process.

Figure 3:
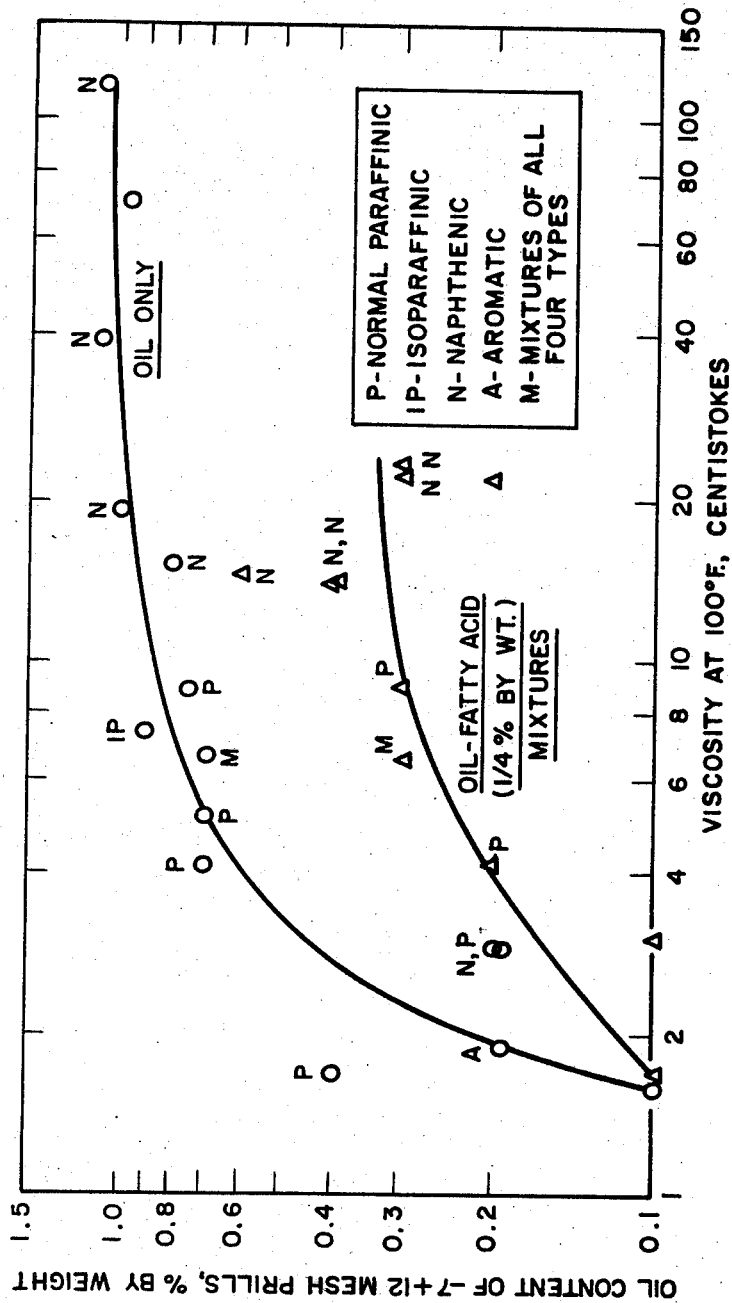

Results of the tests showed little effect of the type of oil (hydrocarbon type) on prill oil content or on the size and quality of the prills obtained. There was, however, a definite relationship between oil viscosity and prill oil content, which is illustrated in FIG. 3. Also, the oil content was reduced significantly by incorporating ¼ percent of fatty acids in the prilling oil. In tests without additive, prill oil contents decreased almost tenfold (0.1 percent vs. 0.9 percent) with a decrease in the viscosity of the prilling medium from 10 to about 1.8 centistokes (100° F.). Prill oil content was further lowered about 50 percent by incorporation of ¼ percent by weight of saturated fatty acids (lauric, myristic, octanoic, palmitic, and stearic) to the oils. Incorporation of these additives had little effect on the viscosity, surface tension, or density of the oils.

EXAMPLE VI

In another series of tests prills of 36-18-0 grade (50 percent of $P_2O_5$ as polyphosphate) were produced in pilot-plant equipment at a rate of about 120 pounds per hour from 99.5 percent urea solution (290° F.) and molten ammonium polyphosphate (15-61-0 grade from 76 percent $P_2O_5$ electric-furnace acid). In general, the prill cup discharge temperature was controlled at 270° F. and the prilling oils (metal quenching, mineral seal and kerosene) were cooled to 80° to 100° F. In most tests fines prepared by mixing ground (−12 mesh) urea and ammonium polyphosphate were added to the cup at a rate up to about 1 pound per 5 pounds of melt to control the prill cup temperature. These fines were used instead of regular oily recycle fines to more accurately judge the effect of changes in centrifuge operation on prill oil contents. Centrifuging was carried out in a pilot plant vertical screening type continuous centrifuge as well as in a batch laboratory centrifuge; under centrifuging conditions that would be encountered in commercial batch-interruptable centrifuges. It was recognized that the use of kerosene as the prilling medium would require strict care to prevent health hazard and fire since kerosene vaporizes at a relatively low temperature. In the pilot plant, large fans were used to prevent any accumulation of vapors. Less hazard is involved in use of the other oils. Results from the tests are shown in Table IV below.

Prilling in metal quenching oil 36-16-0 urea-ammonium phosphate prilled in metal quenching oil (viscosity, 23 centistokes at 100° F. was centrifuged in the vertical continuous centrifuge at a centrifugal force of 1000 G's when it was equipped with the half helix and then with the full helix. In these tests, the oil content of the prills was 1.8 and 2.0, respectively. In comparison, centrifuging in the batch unit for 1 minute at 350 G gave prills with oil contents of about 1 percent by weight.

Prilling in mineral seal oil

With mineral seal oil (viscosity of 4 centistokes at 100° F.), operation of the centrifuge at 1000 G gave prills of a lower oil content than those de-oiled at somewhat higher or lower centrifugal forces, as shown in the following tabulation. The data also show that the full-turn helix was not as effective as the half-turn helix.

| Maximum centrifugal force, G | Oil content, percent by wt. | |
|---|---|---|
| | Half-turn helix | Full-turn helix |
| 600 | 1.5 | 1.4 |
| 800 | 1.3 | 1.3 |
| 1,000 | 1.0 | 1.5 |
| 1,400 | 1.7 | 1.4 |

Operation at lower centrifugal forces (300 and 350 G) in some instances gave still lower oil contents (0.7–0.9 percent) but the centrifuge could not be operated for more than about an hour without clogging of the cone screen. In comparison, prills centrifuged in the batch unit for 1 minute at 350, 1000, and 1400 G contained about 0.7, 0.4, and .3 percent oil, respectively. Prill oil content was less than that obtained with use of the more viscous metal quenching oil.

Prilling in mineral seal oil containing ¼ percent lauric acid

In the laboratory tests discussed earlier in Example V, the product oil content was reduced from 0.7 to 0.2 percent (1400 G centrifugal force) by incorporation of ¼ percent lauric acid in this oil. Therefore, this prilling medium was tested in the pilot plant. When the screening-type centrifuge was equipped with the half-turn helix and operated at 800 to 1200 G, the product oil content was decreased from 1.0 to about 0.7 percent.

Prilling in kerosene

With use of kerosene (viscosity, 2 centistokes at 100° F.), as the prilling medium the oil content of the product was 0.6–0.7 percent at centrifugal forces of 600 to 1400 G. The oil content of prills processed in the batch centrifuge was only 0.1 to 0.2 percent. These prill oil contents were less than those by use of the more viscous mineral seal oil (without fatty acid additive) or metal quenching oil.

What I claim as new and desire to secure by Letters Patent of the United States is:

1. In an improved process for the production of strong crystalline granular high-analysis urea-ammonium polyphosphates eminently suitable as fertilizer materials, which comprises the steps of:

(1) combining and intimately mixing a stream of molten ammonium polyphosphate with a stream of concentrated urea solution in a mixing and delivery vessel, wherein the temperature in said mixing and delivery vessel is maintained in the range from about 190° F. to about 325° F. and the residence time of the material therein is maintained in the range from about 2 minutes to about 0.01 minute, said concentrated urea solution containing at least 97 percent urea by weight, said ammonium polyphosphate containing in the range from about 25 percent to about 98 percent polyphosphate, expressed as percent of total $P_2O_5$, and the feed material constituent ratios, expressed as pounds of urea to pounds of ammonium polyphosphate, is in the range from about 85:15 to about 25:75;

(2) discharging from said mixing and delivery vessel the resulting fluid mixture of urea and ammonium polyphosphate into droplet-forming means wherein the temperature of said droplet-forming means is maintained in the range from about 190° F. to about 325° F. and the residence time of the material therein is in the range from about 2 minutes to about 0.01 minute;

(3) dividing the material in said droplet-forming means while in liquid form into drops and causing the drops to cool and solidify by subsequently allowing them to fall through a liquid medium contained in a vessel, said liquid medium maintained at a temperature in the range from about 32° F. to about 175° F. and characterized by the fact that said urea-ammonium polyphosphate is substantially insoluble therein and substantially non-reactive therewith; and (4) withdrawing from the vessel containing said liquid medium the resulting cooled and solidified drops along with a portion of said liquid medium to separating means wherefrom is recovered the granular urea-ammonium polyphosphate and wherefrom is recycled back to the liquid medium-containing vessel substantially all of the liquid medium withdrawn therefrom;

the improvement in combination therewith for substantially reducing the oil content of the resulting recovered granular urea ammonium polyphosphate product, which improvement consists essentially of adding to said liquid medium predetermined quantities of fatty acids to maintain therein in the range from about 0.01 to about 5.0 percent by weight based on the weight of said liquid medium, said fatty acids selected from the group consisting of lauric, myristic, octanoic, stearic, palmitic, oleic, linoleic, and mixtures thereof.

2. The improved process of claim 1 wherein the predetermined quantity of said fatty acid is maintained in said liquid medium in the range of about 0.25 to about 1.0 percent based on the weight of said liquid medium.

3. The improved process of claim 2 wherein said fatty acids are of the saturated type and are selected from the group consisting of lauric, myristic, octanoic, palmitic, stearic, and mixtures thereof.

4. The improved process of claim 2 wherein said fatty acids are of the unsaturated type and are selected from the group consisting of oleic, linoleic, and mixtures thereof.

5. In an improved process for the production of strong crystalline granular high-analysis urea-ammonium polyphosphates eminently suitable as fertilizer materials, which comprises the steps of:

(1) combining and intimately mixing a stream of molten ammonium polyphosphate with a stream of concentrated urea solution in a mixing and delivery vessel, wherein the temperature in said mixing and delivery vessel is maintained in the range from about 190° F. to about 325° F. and the residence time of the material therein is maintained in the range from about 2 minutes to about 0.01 minute, said concentrated urea solution containing at least 97 percent urea by weight, said ammonium polyphosphate containing in the range from about 25 percent to about 98 percent polyphosphate, expressed as percent of total $P_2O_5$, and the feed material constituent ratios, expressed as pounds of urea to pounds of ammonium polyphosphate, is in the range from about 85:15 to about 25:75;

(2) discharging from said mixing and delivery vessel the resulting fluid mixture of urea and ammonium polyphosphate into droplet-forming means wherein the temperature of said droplet-forming means is maintained in the range from about 190° F. to about 325° F. and the residence time of the material therein is in the range from about 2 minutes to about 0.01 minute;

(3) dividing the material in said droplet-forming means while in liquid form into drops and causing the drops to cool and solidify by subsequently allowing them to fall through a liquid medium contained in a vessel, said liquid medium maintained at a temperature in the range from about 32° F. to about 175° F. and characterized by the fact that said urea-ammonium polyphosphate is substantially insoluble therein and substantially non-reactive therewith; and (4) withdrawing from the vessel containing said liquid medium the resulting cooled and solidified drops along with a portion of said liquid medium to separating means wherefrom is recovered the granular urea-ammonium polyphosphate and wherefrom is recycled back to the liquid medium-containing vessel substantially all of the liquid medium withdrawn therefrom;

the improvement in combination therewith for substantially reducing the oil content of the resulting recovered granular urea-ammonium polyphosphate product, which improvement consists essentially of contacting said solidified drops in said separating means with an oil-removing medium in amounts of about 0.1 pound of said oil-removing medium per pound of said solidified drops, said oil-removing medium selected from the group consisting of methyl alcohol, phosphoric acid, and mixtures thereof.

References Cited

UNITED STATES PATENTS 3,578,433   5/1971   Bottai et al. _____ 71—29

CHARLES N. HART, Primary Examiner

U.S. Cl. X.R.

71—64 DB